May 25, 1943.  A. TRASK  2,320,314
DIFFERENTIAL SPRING SUSPENSION FOR VEHICLES
Filed Nov. 29, 1940  2 Sheets-Sheet 1

Inventor
Allen Trask
By Williamson & Williamson
Attorneys

Patented May 25, 1943

2,320,314

UNITED STATES PATENT OFFICE 2,320,314

DIFFERENTIAL SPRING SUSPENSION FOR VEHICLES

Allen Trask, St. Paul, Minn.

Application November 29, 1940, Serial No. 367,752

8 Claims. (Cl. 267—8)

This invention relates to spring suspensions and more particularly to spring suspension and shock absorption for vehicles.

My invention is an improved form of spring suspension such as disclosed in my prior Patent Number 2,176,159, issued October 17, 1939, which discloses shock absorbing means comprising a double acting shock absorber in series with a spring controlling the relative motion between the vehicle wheel and the frame.

I have found that in combination with the ordinary vehicle spring a shock absorbing device comprising a double acting shock absorber and a spring connecting the same to the axle will give greatly improved riding qualities under most conditions. Under some circumstances, however, the ordinary vehicle spring which will be called the body spring and my additional spring which will hereinafter be called the wheel spring will attain octave frequency of oscillation and produce a consequent harmonic action which, of course, will cause excessive oscillation between the sprung and unsprung portions of the vehicle. Through actual test it has been discovered that a wheel spring having a frequency from between two to three times the frequency of the conventional body spring will produce greatly improved riding qualities and under no conditions will there be a harmony of frequency between the two springs. Experiment has shown that the preferred frequency ratio is one wherein the wheel spring frequency is approximately two and one-half times the frequency of the body spring.

It is from a practical standpoint impossible to produce springs having an exact frequency relationship and it is common practice for vehicle spring manufacturers to produce them within limits of plus or minus ten per cent of the specified elastic characteristics. For that reason it is not practical to exactly specify a particular spring ratio. Experiments have shown that a wheel spring frequency of between two to three times the frequency of the body spring will give the desired improved riding qualities without producing harmonic action.

It is, therefore, a general object of my invention to provide a spring suspension and shock absorption structure which will insure improved riding qualities and which will prevent a harmony of action between the ordinary body spring and the wheel spring.

Another object of the invention is to provide a wheel spring which is elastic to such a degree that its deflection under a given weight is from one-eighth to one-quarter of the deflection of the body spring.

A further object of the invention is to provide spring suspension and shock absorption means for vehicles which is capable of utilizing a conventional double acting dash pot of the cylinder and radial arm type.

Still another object of the invention is to provide a structure of the general type described above which is capable of utilizing a hydraulic shock absorber of the so-called "airplane" type which includes a cylinder and piston with a restricted fluid passage connecting the sides of the cylinder at either side of the piston. It is also capable of being utilized in conjunction with a shock absorber of the balanced opposed piston type.

These and other objects and advantages of the invention will more fully appear from the following description made in connection with the accompanying drawings, wherein like reference characters refer to the same parts throughout the views, and, in which.

Figure 1:
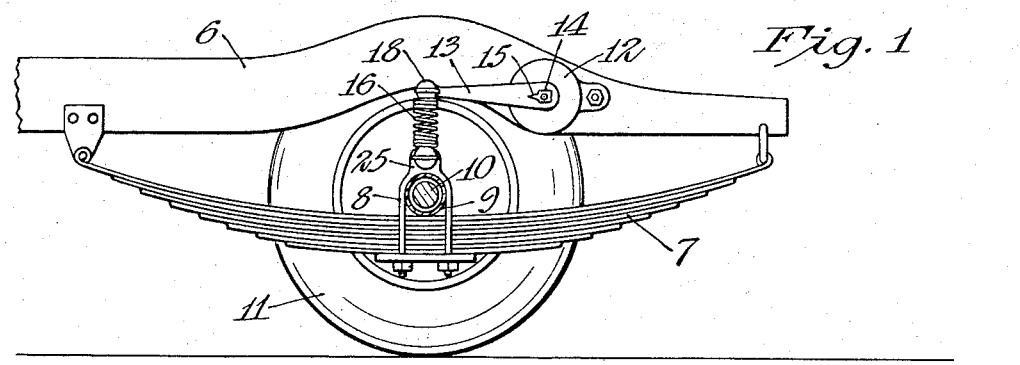
Fig. 1 is a fragmentary elevation of the rear portion of a vehicle chassis with the near wheel of the chassis removed.

In Fig. 1 there is shown the rear end portion of a vehicle chassis frame member 6. The frame member has a body spring 7 of conventional type connected thereto by shackles as well known in the art. Midway of the ends of the body spring 7 suitable U-bolts are connected to the spring and also extend over a housing 9 for a rear axle 10. Wheels such as 11 are, of course, connected to the ends of said axle.

Mounted on the chassis frame 6 is a shock absorber 12 which is of the rotary piston type having a movable arm 13 adapted to swing with a pivot 14 either in an upward or downward direction. The shock absorber is provided with a small adjustment element 15 which permits adjustment of the resistance of the arm 13 to movement. In the usual spring and shock absorber installation the shock absorber is so adjusted that the arm 13 has greater resistance to rebound movement than to compression movement. For the purpose of my invention a shock absorber arm 13 having equal resistance to movement in upward and downward directions may be used as well as the conventional type.

Figure 3:
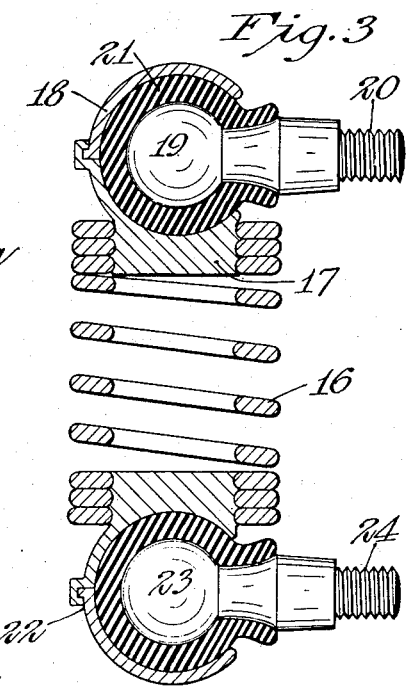
Fig. 3 is an enlarged vertical section through the shock absorber spring unit shown in Fig. 1 and with the wheel spring unit turned on its vertical axis at right-angles to the unit in Fig. 1.

Connected between each of the U-bolts 8 and the free end of the shock absorber arm 13 is a helical spring 16 which is made up of flat metal as best shown in Fig. 3. This spring 16 has a natural frequency of aproximately two and one-half times the frequency of the body spring 7. The upper end of the spring 16 has its convolutions substantially abutting, and this portion of the spring 16 is threaded upon an externally threaded member 17 formed integrally with or connected to the lower half of a pressed sheet metal socket 18. Lying within the socket 18 is a ball 19 having a threaded stud 20 extending therefrom. The ball 19 is seated in a rubber cup 21 and is relatively firmly held in the socket 18 but is capable of a certain degree of yielding movement relative to the socket.

The lower end of the wheel spring 16 is connected to a socket 22 containing a ball 23 in the same manner as described in connection with socket 18 and ball 19. The upper stud 20 is suitably connected to the shock absorber 12 and the lower stud 24 is connected to an ear or bracket 25 which may be welded or otherwise secured to the U-bolts 8 which secure the body spring 7 to the axle housing 9.

Figure 2:
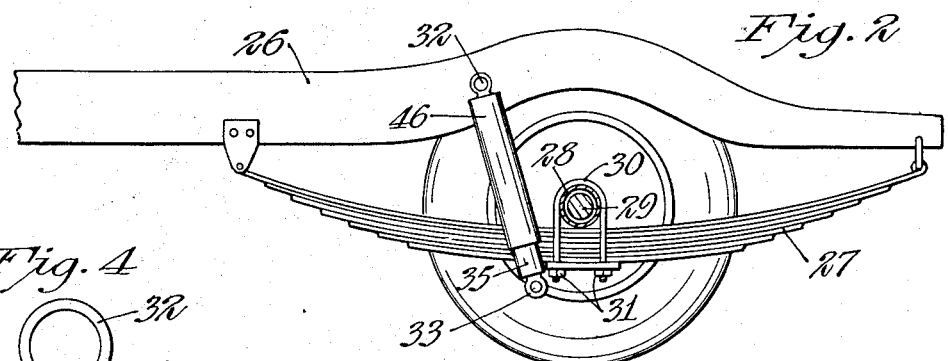
Fig. 2 is a view similar to Fig. 1 with a different type of shock absorber shown.

In Fig. 2 there is shown a frame member 26, a body spring 27, an axle housing 28, and an axle 29. The spring 27 is secured to the housing by one or more U-bolts 30.

Figure 5:
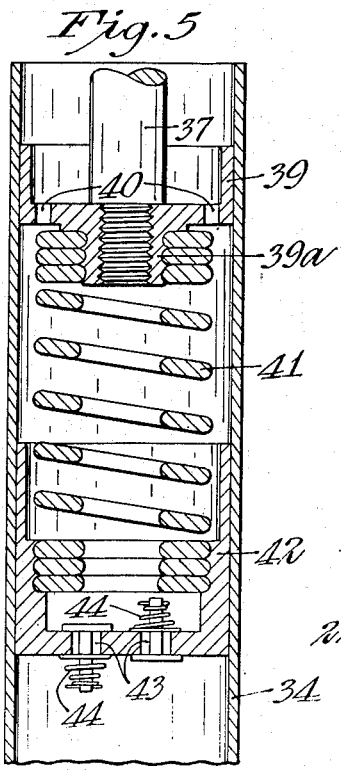
Fig. 5 is an enlarged fragmentary section of the piston assembly of the shock absorber unit of Figs. 2 and 4.

Connected between a portion of the frame 26 and a bracket 31 connected to the U-bolts 30 is a shock absorber of the so-called "airplane" type, the points of connection being indicated at 32 and 33. This shock absorber includes the usual inner casing 34 and a reservoir casing 35 which surrounds the inner casing 34 and is connected therewith by means of a head 36 at the upper ends of said casings. A piston rod 37 extends through the head 36 and also through a packing gland 38, and on the inner or lower end of the piston rod 37 a piston 39 is secured. This piston, as best shown in Fig. 5, is provided with two or more apertures 40 which permit the flow of oil or other liquid from one side of the piston to the other on one side of the inner casing or cylinder 34. A spring 41 which is generally similar to the spring 16 in Fig. 3 has its upper (abutting) convolutions threaded upon a sleeve-like extension 39a forming a part of the piston head 39, and the lower end of said spring 31 is threaded into a cup-shaped piston 42, thus providing a yielding connection between the upper piston 39 and said lower piston 42. The piston 42 is provided with a pair of openings 43 which respectively have associated therewith one-way spring seated valves indicated generally at 44. As in the case of the wheel spring 16 the spring 41 has a natural frequency of approximately two and one-half times that of the body spring 27.

The piston rod 37 is connected to a head 45 and from this head depends a sleeve-like protective apron 46 which is spaced from and movable relative to the two casings 34 and 35 upon movement of the piston rod 37 and piston 39 in the inner casing or cylinder 34. The space between the casings 34 and 35 comprises a supplemental oil storage reservoir 47 and entry of fluid from that reservoir to the casing or cylinder 35 is through a check valve 48.

Figure 4:
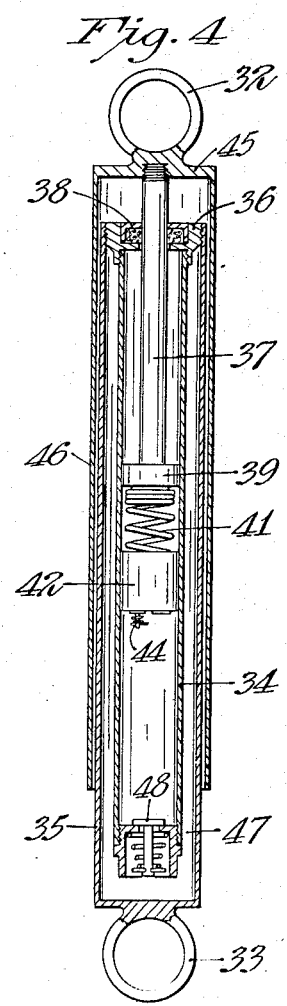
Fig. 4 is an enlarged vertical section through the shock absorber unit shown in Fig. 2.
Figure 6:
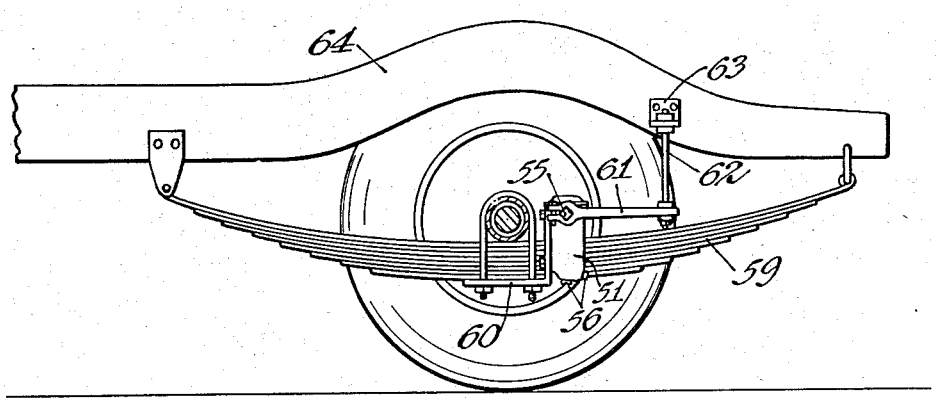
Fig. 6 is a fragmentary elevation similar to Figs. 1 and 2 showing another application of the invention.
Figure 7:
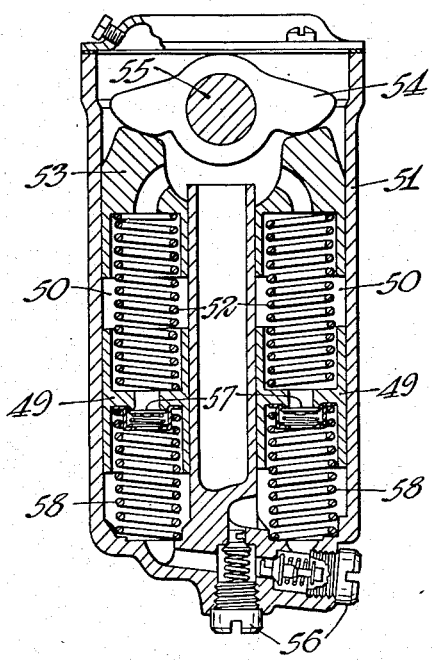
Fig. 7 is an enlarged vertical section through the shock absorber shown in Fig. 6.

In Figs. 6 and 7 there is shown the application of my invention to a shock absorber which includes a pair of balanced opposed pistons 49 which are movable in cylinders 50 formed in the housing 51. Springs 52 are interposed between the pistons 49 and sliding blocks 53 which blocks are acted upon by cams 54 on a rocker arm 55. Springs 52 serve the same function as spring 16 in Figs. 1 and 3, and the spring 41 in Figs. 2 and 4. These springs have a natural frequency of approximately two and one-half times the frequency of the body spring 59 shown in Fig. 6. Spring loaded check valves 56 control the flow of fluid from one cylinder to the other, and it will be noted that the arrangement of these valves is such that flow in one direction unseats one of the valves and flow in the other direction unseats the other valve. Additional check valves 57 restrict liquid from passing upwardly through the apertures shown in the pistons 49.

Interposed between the bottoms of the cylinders 50 and the undersides of the pistons 49 are spring members 58 which serve to keep pistons 49, springs 52, and sliding blocks 53 in contact relation with cams 54.

The apparatus may be installed by mounting the housing 51 on the upwardly extending portion of an angular bracket 60 and conecting the rocker arm 55 to a lever 61 whose right-hand end is in turn connected by a link 62 to a bracket 63 on the vehicle frame 64.

The wheel springs 16, 41 and 52 in the three embodiments are designed with such deflection-tension characteristics that they are stiff enough to cause either dash-pot to follow substantially the complete amplitude of movement of the frames 6, 26 or 64 which carry the body in vertical relation to the horizon at their natural frequency of oscillation on the conventional body spring. However, the wheel springs 16, 41 or 52 will not have sufficient stiffness to cause their dash-pots to follow the full amplitude of relative movements between the wheel and frame where the returns of wheel oscillation are faster than the natural frequency of the frame oscillation with the vehicle body thereon.

When the body frame of the vehicle is oscillating slowly in the range of its natural frequency on the body spring there is sufficient time at the end of each stroke of oscillation and during an instant of rest for the wheel springs 16, 41 or 52 to relieve themselves of tension against the resistance of the dashpot, thus causing the latter to complete the amplitude of the corresponding movement of the vehicle wheel before the wheel begins its oscillation stroke in the opposite direction. If the wheel springs 16, 41 or 52 are not stiff enough to cause the dash-pot member to complete its movement then the conventional body springs will change their direction of movement first and both springs will rebound together and impart to the body or frame an undesirable rebound or bounce.

When the vehicle wheel oscillates relative to the body at frequencies greater than the natural frequency of the body or frame on the body spring it will not cause the dash-pot to follow the amplitude of oscillation of the vehicle wheel since the dash-pot or shock absorber offers increased resistance proportional to the square of speed at which the wheel attempts to force the shock absorber to move through the medium of the wheel spring. The wheel spring in accordance with Hookes' law flexes in direct proportion to the pressure exerted, and during relatively fast oscillation the wheel spring 16, 41 or 52 flexes substantially in direct proportion to the speed of movement as compared to the much greater "speed squared" resistance of the shock absorber or dash-pot. In other words when the wheel and wheel spring are oscillating relatively fast the dash-pot or shock absorber has insufficient time to complete the amplitude of the movement of wheel and body spring and this difference in amplitude will be taken up by increased movement of the wheel springs 16, 41 or 52. The flexing of the wheel spring causes the oscillation cycle of the dash-pot or shock absorber to lag differentially out of phase with the corresponding oscillation cycle of the vehicle wheel for a part of a cycle that increases in proportion to a full cycle as the oscillation frequency of the vehicle wheel exceeds the natural frequency of the vehicle frame which carries the body. This out-of-phase oscillation of the dash-pot contributes greatly to the smooth riding qualities of the vehicle.

As the wheel spring is flexed against the resistance of the shock absorber during oscillations of the vehicle wheel which are faster than the natural frequency of the vehicle frame, the wheel spring tends to smooth out short sharp bumps which occur in rapid succession. The wheel spring tends to return the body spring towards its natural position before the frame has time to follow the movement of the wheel in a vertical direction.

When the wheel and body spring are oscillating at body frequency or slower the dash-pot or shock absorber absorbs all of the kinetic energy transmitted from the wheel spring since the dash-pot can follow through the full amplitude of movement of the body spring. However, when the wheel and wheel spring oscillate at a frequency greater than that of the frame or body frequency, energy is returned by action of the dash-pot to the vehicle wheel. This is due to the lag of the dash-pot behind the movement of the body spring and also due to the fact that the dash-pot and body spring are out of phase with a resulting tension set up in the wheel spring.

The ideal tension-deflection characteristics of the wheel spring in relation to the weight supported by a wheel cannot be given exactly for all cases in view of the fact that several variable factors influence the determination of its characteristics. They are dependent a great deal upon the natural frequency of the sprung weight of the vehicle and also the location of the wheel either under the front or rear portion of the vehicle or the distribution of weight on the wheels. Vehicles having a sprung weight with a relatively fast natural frequency of oscillation require stiffer wheel springs than those which have relatively slow sprung weight or body frequencies. Interleaf spring friction as well as efficiency of lubrication in laminated leaf springs is also an important factor in the particular installation.

An installation on a "Ford" passenger motor vehicle is set up in the following manner: The four wheels of the vehicle have a normal load of approximately 750 pounds per wheel. The transverse front body spring at each front wheel will deflect one inch upon an increase of weight or pressure of approximately 90 pounds. The rear body spring at each rear wheel will deflect one inch upon an increase of pressure or weight of approximately 80 pounds. Connected to the body or frame adjacent each wheel is a double acting hydraulic dash-pot and this is connected in series with a helical coil spring to the wheel. Each coil spring or wheel spring has a capacity of approximately 550 pounds per inch deflection. The front wheel dash-pots have pressure relief valves set to limit their resistance to approximately 180 pounds of pressure against downward movement, whereas the rear wheel dash-pots have their pressure relief valves set to limit their resistance to approximately 300 pounds of pressure against downward movement. Thus it will be seen that the deflection of the wheel springs which are connected to the front wheels is approximately one-sixth of the deflection of the front body spring at each wheel, and the deflection of the wheel springs which are connected to the rear wheels is approximately one-seventh of the amount of deflection of the rear body spring at each wheel. A selection for a desirable relative deflection has been found to be a deflection of the wheel spring within limits of one-quarter to one-eighth of the deflection of the body spring or body spring end with which it cooperates.

It will be recalled that in the first part of the specification it was stated that a wheel spring frequency of two to three times the natural frequency of the body spring has been found to be a ratio which would give improved riding qualities and that relative frequencies within these limits would give the desired smooth riding qualities and would eliminate any possibility of harmonic action of the wheel and body springs. The ideal relative frequencies were given above as a frequency of the wheel spring two and one-half times that of the body spring. Harmonic action of the two springs occurs in octave frequency relationships and it has been found that where the two frequencies are one octave apart as set forth in my above identified prior patent certain conditions will cause harmonic spring action, but where, as in the present case, the frequency of the wheel spring is in the second octave above that of the body spring there is no possibility of such harmonic action. While the differences between the invention disclosed in my above identified patent and that disclosed herein might appear slight, actual experiment has shown that greatly improved results follow from the change in octave relationship of the frequencies in the two springs. Thus when the frequency of the wheel spring becomes greater than twice that of the body spring the possibility of harmonic action is eliminated.

From the foregoing description it will be seen that I have provided a spring suspension and shock absorption system wherein means is provided for taking care of relative movement between the wheel and body or frame of a vehicle which will dissipate bounce or shock through the normal action of the body spring and also will absorb or dissipate vehicle wheel action shock of higher frequency than that which a conventional spring suspension can absorb, through the medium of shock absorber unit and wheel spring connected in series between the body or frame and the wheel. The particular frequency ratios as well as deflection characteristics set forth in this specification preclude harmonic action which is possible where other frequency ratios are utilized. The invention has been illustrated and described in connection with the rotary piston type of hydraulic dash-pot as well as with the so-called "airplane" type hydraulic dash-pot and a double piston type.

It should be noted that I utilize a coil type spring as distinguished from the spiral spring shown in my former patent. While either type of spring can be utilized it has been found that the helical spring is more satisfactory in actual use.

Although I have illustrated and described double acting hydraulic dash-pots in connection with my improved suspension and shock absorption system it is, of course, to be understood that any other equivalent shock absorbing means can be used and that various changes may be made in the form, details, arrangement and proportions of the parts without departing from the scope of my invention.

What is claimed is:

1. In a spring suspension, a first member and a second member arranged for relative movement, a first spring yieldably connecting said members, a shock absorbing device having a portion fixed to said first member and having a relatively movable portion adapted for connection with said second member, and a second spring interposed between said relatively movable shock absorber portion and said second member, said second spring having a natural frequency of between two to three times the frequency of said first spring under an equal weight.

2. In a spring suspension, a first member and a second member arranged for relative movement, a first spring yieldably connecting said members, a shock absorbing device having a portion fixed to said first member and having a relatively movable portion adapted for connection with said second member, and a second spring interposed between said relatively movable shock absorber portion and said second member, said second spring being of such elasticity that its deflection when subjected to a given weight is between one-eighth of one-quarter of the deflection of said first spring.

3. In a spring suspension, a first member and a second member, spring means connected between said members and supporting said first member, shock absorb'ng means having a portion rigidly secured to said first member and having a relatively movable portion adopted for connection with said second member and a second spring interposed between said movable shock absorber portion and said second member to provide a series connection between said two members, the series connection including the shock absorbing means and second spring, and said second spring having a frequency of between two to three times the frequency of said first spring under a given weight.

4. In a spring suspension, a first member and a second member, a spring connecting said members and supporting said first member, a shock absorbing device comprising a fluid casing secured to one of said members, a portion of said shock absorbing device being adapted for rotary motion, an arm extending radially from the axis of rotation of said rotary portion, and a second spring connected between said arm and the other of said members, said second spring having a frequency of greater than two and less than three times the frequency of said first mentioned spring under a given load.

5. In a spring suspension, a first member and a second member movable relative to each other, a first spring connected between said members and supporting said first member, a cylinder having a first piston arranged to reciprocate therein, said piston having a fluid bypass permitting the flow of fluid from one side of the piston to the other in said cylinder, a second piston within said cylinder movable with respect to said first piston, and a second spring connecting said first and second pistons, said second spring having a frequency of between two to three times the frequency of said first spring.

6. In a spring suspension, a first member and a second member arranged for relative movement, a first spring yieldably connecting said members, a shock absorbing device having a portion fixed to said first member and having a relatively movable portion adapted for connection with said second member, and a second spring connecting said relatively movable shock absorber portion with said second member, said second spring having a natural frequeucy of between two to three times the natural frequency of said first spring under an equal weight.

7. In a spring suspension, a first member and a second member arranged for relative movement, a first spring yieldably connecting said members, a housing mounted on one of said members, a rocker arm having a portion extending into said housing, a pair of fluid cylinders in said housing, cam followers in said cylinders movable by said rocker arm, pistons in said cylinders, second springs between said cam followers and said pistons, and third springs positioned between said pistons, said housing arranged to maintain said pistons, said second springs and said cam followers in series contact with said rocker arm, and said second springs having frequencies from two to three times the frequency of said first spring under a given load.

8. In a spring suspension, a first member and a second member arranged for relative movement, a first spring yieldably connected between said members, a shock absorbing device having a portion fixed to said first member and having a relatively movable portion adapted for connection with said second member, and a second spring interposed between said relatively movable shock absorber portion and said second member, said second spring having a natural frequency of between two to three times the frequency of said first spring under an equal load.

ALLEN TRASK.